(12) United States Patent
Shinomiya et al.

(10) Patent No.: US 11,811,800 B2
(45) Date of Patent: Nov. 7, 2023

(54) TRAFFIC FEATURE INFORMATION EXTRACTION DEVICE, TRAFFIC FEATURE INFORMATION EXTRACTION METHOD, AND TRAFFIC FEATURE INFORMATION EXTRACTION PROGRAM

(71) Applicant: NIPPON TELEGRAPH AND TELEPHONE CORPORATION, Tokyo (JP)

(72) Inventors: Kazuma Shinomiya, Musashino (JP); Kazunori Kamiya, Musashino (JP); Bo Hu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 242 days.

(21) Appl. No.: 16/975,397

(22) PCT Filed: Feb. 22, 2019

(86) PCT No.: PCT/JP2019/006880
§ 371 (c)(1),
(2) Date: Aug. 25, 2020

(87) PCT Pub. No.: WO2019/163963
PCT Pub. Date: Aug. 29, 2019

(65) Prior Publication Data
US 2020/0404009 A1     Dec. 24, 2020

(30) Foreign Application Priority Data
Feb. 26, 2018  (JP) .................................. 2018-031914

(51) Int. Cl.
G06F 15/173      (2006.01)
H04L 9/40        (2022.01)
(Continued)

(52) U.S. Cl.
CPC ........ *H04L 63/1425* (2013.01); *G06F 16/906* (2019.01); *G06N 20/00* (2019.01); *H04L 43/08* (2013.01)

(58) Field of Classification Search
None
See application file for complete search history.

(56) References Cited

U.S. PATENT DOCUMENTS 9,602,530 B2 * 3/2017 Ellis .................... H04L 63/1416
10,027,689 B1 * 7/2018 Rathor ................ H04L 63/1416
(Continued)

FOREIGN PATENT DOCUMENTS

| JP | 6053091 B2 | 12/2016 |
| WO | 2015/141560 A1 | 9/2015 |
| WO | 2016/080232 A1 | 5/2016 |

OTHER PUBLICATIONS

International Search Report and Written Opinion dated May 21, 2019 for PCT/JP2019/006880 filed on Feb. 22, 2019, 9 pages including English Translation of the International Search Report.
(Continued)

*Primary Examiner* — Phuoc H Nguyen
(74) *Attorney, Agent, or Firm* — XSENSUS LLP

(57) ABSTRACT

A traffic characteristic information extracting device includes a memory, and processing circuitry coupled to the memory and configured to acquire traffic information satisfying a predetermined condition from network traffic data, extract characteristic information from the acquired traffic information, classify the traffic information based on the extracted characteristic information, analyze a classification result obtained at the classifying and generate signatures, and output a signature satisfying a predetermined condition among the generated signatures.

8 Claims, 3 Drawing Sheets

(51) Int. Cl.
*G06F 16/906* (2019.01)
*G06N 20/00* (2019.01)
*H04L 43/08* (2022.01)

(56) References Cited

U.S. PATENT DOCUMENTS

| | | | |
|---|---|---|---|
| 10,826,934 B2 * | 11/2020 | Krasser | G06F 21/56 |
| 10,984,452 B2 * | 4/2021 | Agrawal | G06N 5/04 |
| 11,063,814 B2 * | 7/2021 | Ramachandran | G06F 16/955 |
| 11,184,378 B2 * | 11/2021 | Meshi | H04L 63/1441 |
| 11,347,707 B2 * | 5/2022 | Dornemann | G06F 16/2272 |
| 2009/0235555 A1 * | 9/2009 | Jie Bo | D06F 34/26 34/82 |
| 2015/0007312 A1 * | 1/2015 | Pidathala | H04L 63/1433 726/22 |
| 2016/0028750 A1 * | 1/2016 | Di Pietro | H04W 12/125 726/23 |
| 2016/0087925 A1 * | 3/2016 | Kalavagattu | H04L 43/10 709/206 |
| 2016/0127404 A1 * | 5/2016 | Baxley | H04W 12/08 726/22 |
| 2017/0163666 A1 * | 6/2017 | Venkatramani | H04L 63/0272 |
| 2017/0310694 A1 | 10/2017 | Kamiya et al. | |
| 2018/0197089 A1 * | 7/2018 | Krasser | G06N 3/0445 |
| 2018/0198800 A1 * | 7/2018 | Krasser | G06N 20/00 |
| 2019/0188065 A1 * | 6/2019 | Anghel | G06F 11/0778 |

OTHER PUBLICATIONS

Shigematsu, K., et al., "Automated Generation of Signatures for Malware Detection by Analyzing Network Traffic," Lecture proceedings (3) of the 73th (2011) National Conference: network security, Information Processing Society of Japan, Mar. 2, 2011, pp. 3-487 to 3-488 (with English Translation).

* cited by examiner

TRAFFIC FEATURE INFORMATION EXTRACTION DEVICE, TRAFFIC FEATURE INFORMATION EXTRACTION METHOD, AND TRAFFIC FEATURE INFORMATION EXTRACTION PROGRAM

CROSS-REFERENCE TO RELATED APPLICATIONS

The present application is based on PCT filing PCT/JP2019/006880, filed Feb. 22, 2019, which claims priority to JP 2018-031914, filed Feb. 26, 2018, the entire contents of each are incorporated herein by reference.

TECHNICAL FIELD

The present invention relates to a traffic characteristic information extracting device, a traffic characteristic information extracting method, and a traffic characteristic information extracting program.

BACKGROUND ART

In recent years, according to the spread of the Internet, cyberattacks conducted using malicious software called malware have been increasing. There has been a method of, in detecting a terminal infected with the malware, extracting characteristic information based on header information of traffic transmitted by the terminal, generating a signature, and performing matching with a blacklist.

CITATION LIST

Patent Literature

[PTL 1] Japanese Patent No. 6053091

SUMMARY OF THE INVENTION

Technical Problem

However, in the conventional technique described above, there have been problems described below. For example, since an attacker changes setting of a command and control server in order to avoid detection, even if infection is confirmed by the matching, in some case, a communication destination server is absent or is a normal server. Even if the terminal communicates with a server of the attacker, an attack does not always succeed. Accordingly, even if the signature matches, it cannot be surely determined that the terminal is truly infected with the malware and is receiving damage (for example, operation by the attacker).

A disclosed technique is devised in view of the above, and an object of the disclosed technique is to provide a traffic characteristic information extracting device, a traffic characteristic information extracting method, and a traffic characteristic information extracting program that can accurately determine whether a terminal is receiving damage.

Means for Solving the Problem

In order to solve the problems and achieve the object, in an aspect, a traffic characteristic information extracting device disclosed by this application includes: a memory; and processing circuitry coupled to the memory and configured to: acquire traffic information satisfying a predetermined condition from network traffic data, extract characteristic information from the acquired traffic information, classify the traffic information based on the extracted characteristic information, analyze a classification result obtained at the classifying and generate signatures, and output a signature satisfying a predetermined condition among the generated signatures.

In an aspect, a traffic characteristic information extracting method that is performed by a traffic characteristic information extracting device and that is disclosed by this application includes: acquiring traffic information satisfying a predetermined condition from network traffic data; extracting characteristic information from the acquired traffic information; classifying the traffic information based on the extracted characteristic information; analyzing a classification result obtained at the classifying and generating signatures; and outputting a signature satisfying a predetermined condition among the generated signatures.

Further, in an aspect, a non-transitory computer-readable recording medium stores therein a traffic characteristic information extracting program disclosed by this application that causes a computer to execute a process including: acquiring traffic information satisfying a predetermined condition from network traffic data; extracting characteristic information from the acquired traffic information; classifying the traffic information based on the extracted characteristic information; analyzing a classification result obtained at the classifying and generating signatures; and outputting a signature satisfying a predetermined condition among the generated signatures.

Effects of the Invention

The traffic characteristic information extracting device, the traffic characteristic information extracting method, and the traffic characteristic information extracting program disclosed by this application exert an effect that it is possible to accurately determine whether a terminal is receiving damage.

DESCRIPTION OF EMBODIMENTS

An embodiment of a traffic characteristic information extracting device, a traffic characteristic information extracting method, and a traffic characteristic information extracting program disclosed by this application is explained in detail below with reference to the drawings. Note that the traffic characteristic information extracting device, the traffic characteristic information extracting method, and the traffic characteristic information extracting program disclosed by this application are not limited by the embodiment explained below.

Figure 1:
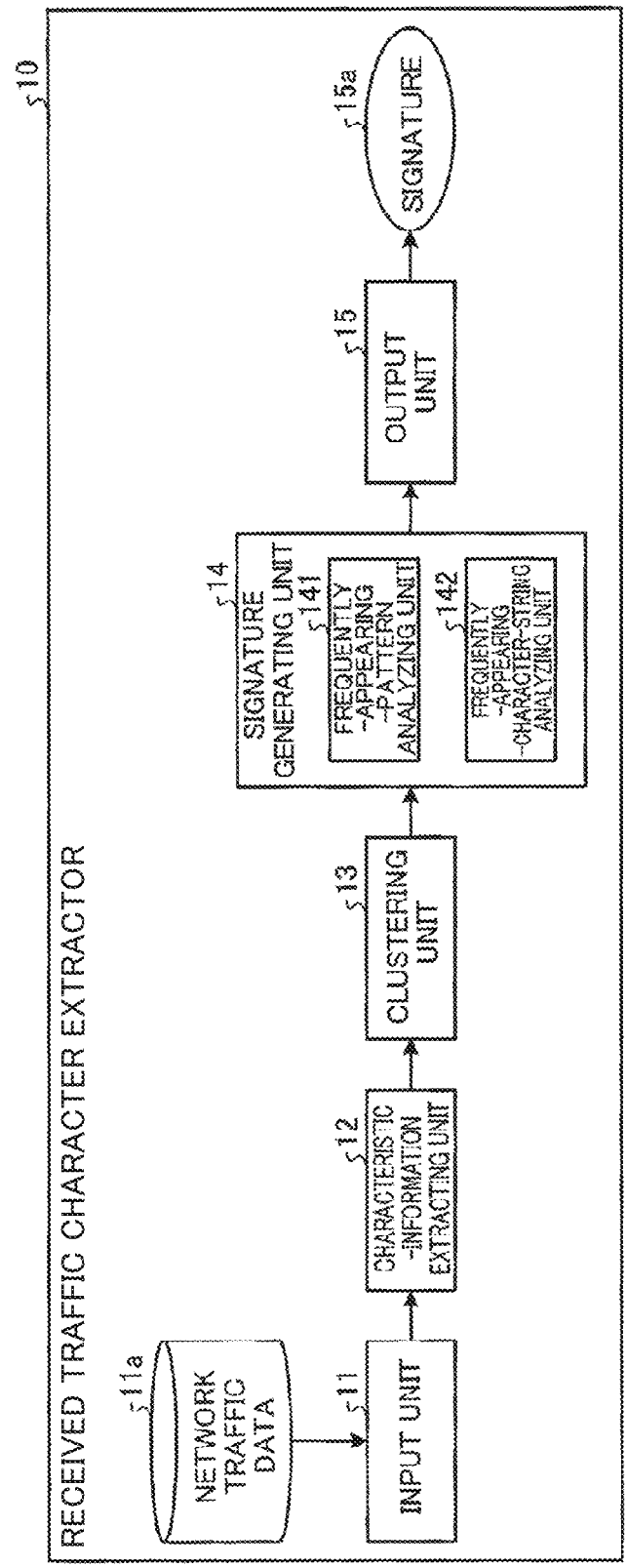
FIG. 1 is a diagram illustrating the configuration of a received traffic character extractor.

First, the configuration of the traffic characteristic information extracting device according to an embodiment disclosed by this application is explained. FIG. 1 is a diagram illustrating the configuration of a received traffic character extractor 10. As illustrated in FIG. 1, the received traffic character extractor 10 includes an input unit 11, a characteristic-information extracting unit 12, a clustering unit 13, a signature generating unit 14, and an output unit 15. These constituent portions are connected such that input and output of signals and data are possible in one direction or both directions.

The input unit 11 acquires traffic information satisfying a predetermined condition from network traffic data 11*a*. The characteristic-information extracting unit 12 extracts characteristic information from the acquired traffic information. The clustering unit 13 classifies the traffic information based on the extracted characteristic information. The signature generating unit 14 analyzes a classification result obtained by the clustering unit 13 and generates signatures. The output unit 15 outputs a signature satisfying (matching) a predetermined condition among the generated signatures.

Figure 2:
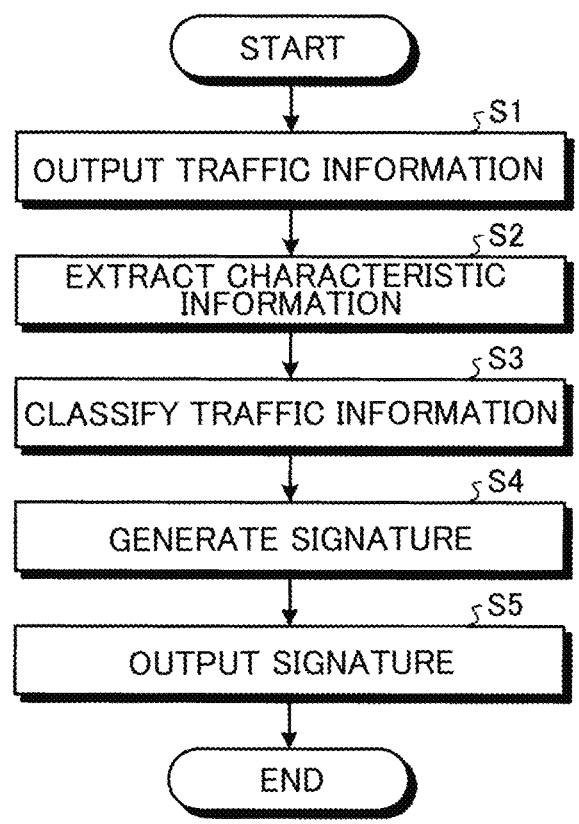
FIG. 2 is a flowchart for explaining the operation of the received traffic character extractor.

Next, the operation of the received traffic character extractor 10 according to the embodiment disclosed by this application is explained. FIG. 2 is a flowchart for explaining the operation of the received traffic character extractor 10.

First, in S1, the received traffic character extractor 10 acquires, with the input unit 11, traffic information satisfying a predetermined condition from the network traffic data 11*a*. In next S2, the received traffic character extractor 10 extracts, with the characteristic-information extracting unit 12, characteristic information from the acquired traffic information. In S3, the received traffic character extractor 10 classifies, with the clustering unit 13, the traffic information based on the extracted characteristic information. In S4, the received traffic character extractor 10 analyzes, with the signature generating unit 14, a classification result obtained by the clustering unit 13 and generates signatures. In S5, the received traffic character extractor 10 outputs, with the output unit 15, a signature satisfying a predetermined condition among the generated signatures.

In the received traffic character extractor 10, the characteristic-information extracting unit 12 may extract the characteristic information based on at least one of information included in a header portion, information included in transmitted data, and information included in received data of the network traffic data. The clustering unit 13 may classify the traffic information using unsupervised machine learning in which learning data serving as teacher information is not used. Consequently, it is possible to determine, based on a more highly accurate classification result, whether the terminal is receiving damage. Further, in analyzing the classification result, the signature generating unit 14 may generate the signatures through a frequently appearing pattern analysis or a frequently appearing character string analysis.

The frequently appearing pattern analysis may be an analysis of the information included in the header portion of the network traffic data and, more suitably, may be an analysis performed using frequently appearing pattern mining. Consequently, it is possible to determine, based on a more highly accurate analysis result, whether the terminal is receiving damage. Alternatively, the frequently appearing pattern analysis may be an analysis of the information included in the transmitted data and the information included in the received data of the network traffic data. Further, the traffic information may be traffic information of reception traffic that the terminal receives when the terminal communicates with a specific server (for example, a malicious server).

In other words, the received traffic character extractor 10 analyzes the network traffic data 11*a* to thereby convert traffic received by the terminal into a signature and detects that communication with a communication destination server (for example, a malicious server) is performed. Simply by detecting the traffic transmitted by the terminal, it is sometimes unknown whether the communication destination server is malicious. However, the received traffic character extractor 10 also extracts characteristics of the traffic received by the terminal and converts a response from the communication destination server into a signature. Therefore, it is possible to surely determine that the terminal is infected with malware or an attack is successful. That is, by examining the response from the communication destination server, it is possible to accurately determine whether the terminal is receiving damage. In the determination, more information such as information concerning a payload not used in the past is extracted as characteristics. Therefore, it is also possible to achieve improvement of a detection ratio and a reduction of a misdetection ratio.

As an application example of the received traffic character extractor 10, when network traffic of a malware-infected terminal is given as input traffic data, whereby the terminal is infected with malware, the received traffic character extractor 10 can extract characteristics of traffic received from a malicious server and convert the characteristics into a signature. Therefore, the received traffic character extractor 10 can determine based on presence or absence of an output of a signature satisfying the predetermined condition that the terminal is infected with malware or the attack is successful. For example, when an output of a signature satisfying the predetermined condition is present, the received traffic character extractor 10 can surely conclude that the terminal is infected with malware or the attack is successful.

As another application example, by reproducing malicious traffic and discriminating a response from a server used by the attacker and responses from other servers, the received traffic character extractor 10 can find the server used by the attacker.

(Traffic Characteristic Information Extracting Program)

Figure 3:
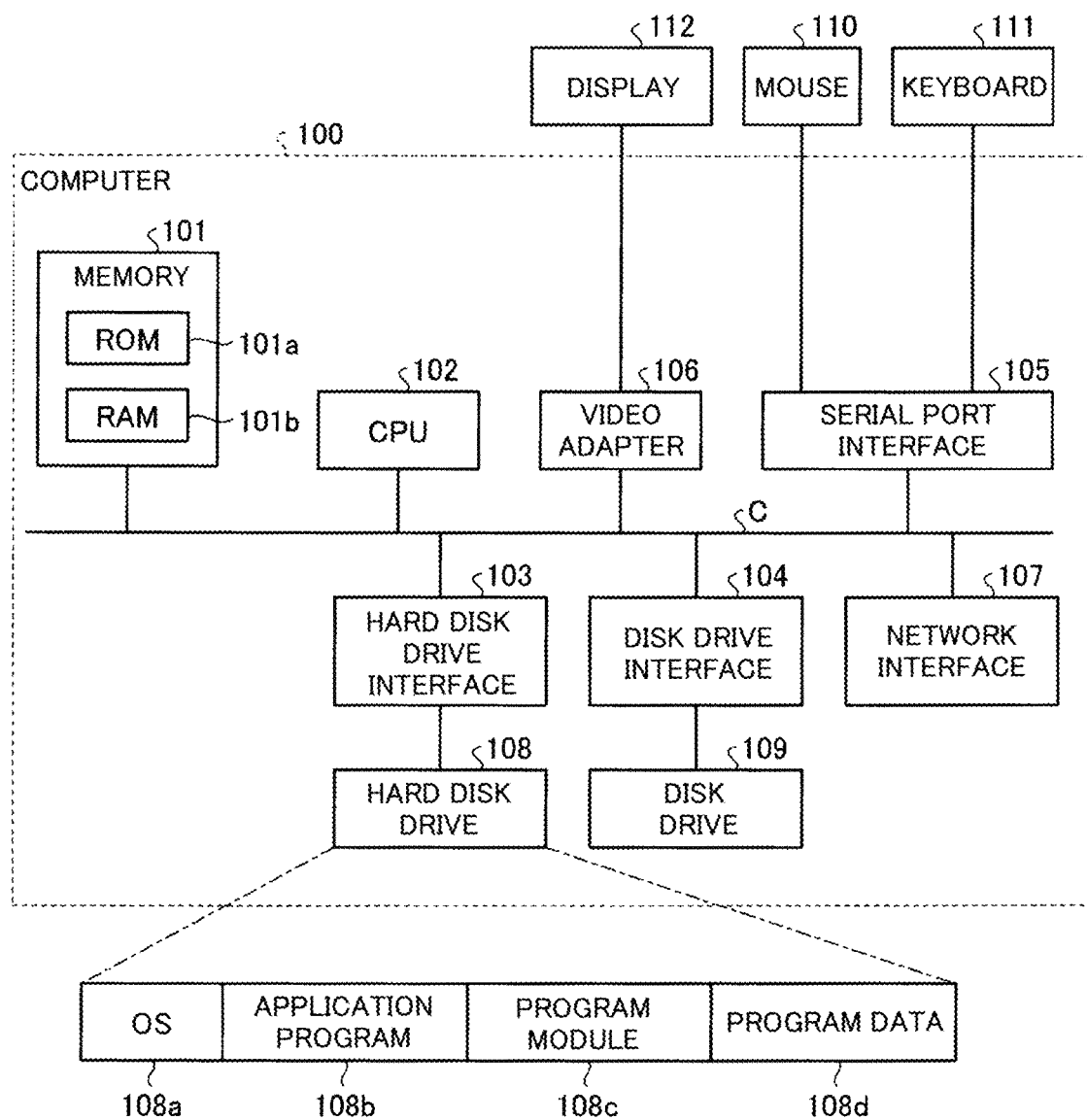
FIG. 3 is a diagram illustrating that information processing by a traffic characteristic information extracting program is specifically realized using a computer.

FIG. 3 is a diagram illustrating that information processing by a traffic characteristic information extracting program is specifically realized using a computer 100. As illustrated in FIG. 3, the computer 100 includes, for example, a memory 101, a CPU (Central Processing Unit) 102, a hard disk drive interface 103, a disk drive interface 104, a serial port interface 105, a video adapter 106, and a network interface 107. These units are connected by a bus C.

The memory 101 includes, as illustrated in FIG. 3, a ROM (Read Only Memory) 101*a* and a RAM (Random Access Memory) 101*b*. The ROM 101*a* stores a boot program such as a BIOS (Basic Input Output System). The hard disk drive interface 103 is connected to a hard disk drive 108 as illustrated in FIG. 3. The disk drive interface 104 is connected to a disk drive 109 as illustrated in FIG. 3. A detachable storage medium such as a magnetic disk or an optical disk is inserted into the disk drive 109. The serial port interface 105 is connected to, for example, a mouse 110 and a keyboard 111 as illustrated in FIG. 3. The video adapter 106 is connected to, for example, a display 112 as illustrated in FIG. 3.

As illustrated in FIG. 3, the hard disk drive 108 stores, for example, an OS (Operating System) 108*a*, an application program 108*b*, a program module 108*c*, program data 108*d*, network traffic data, traffic information, characteristic information, and a signature. That is, the traffic characteristic information extracting program according to the disclosed technique is stored in, for example, the hard disk drive 108 as the program module 108*c* in which a command to be executed by the computer 100 is described. Specifically, the program module 108*c* in which various procedures for executing the same information processing as the information processing of each of the input unit 11, the characteristic-information extracting unit 12, the clustering unit 13, the signature generating unit 14, and the output unit 15, which are described in the above embodiment, is stored in the hard disk drive 108. Data to be used for the information processing by the traffic characteristic information extracting program is stored in, for example, the hard disk drive 108 as the program data 108*d*. The CPU 102 reads out the program module 108*c* and the program data 108*d* stored in the hard disk drive 108 to the RAM 101*b* according to necessity and executes the various procedures.

Note that the program module 108*c* and the program data 108*d* relating to the traffic characteristic information extracting program is not limited to the storage in the hard disk drive 108 and may be stored in, for example, a detachable storage medium and read out by the CPU 102 via the disk drive 109 or the like. Alternatively, the program module 108*c* and the program data 108*d* relating to the traffic characteristic information extracting program may be stored in another computer connected via a network (a LAN (Local Area Network), a WAN (Wide Area Network), or the like) and read out by the CPU 102 via the network interface 107.

The components of the received traffic character extractor 10 explained above are not always required to be physically configured as illustrated. That is, a specific form of distribution and integration of the devices is not limited to the illustrated form. All or a part of the devices can also be configured to be mechanically or physically distributed and integrated in any units according to various loads, states of use, and the like. For example, the clustering unit 13 and the signature generating unit 14 or a frequently-appearing-pattern analyzing unit 141 and a frequently-appearing-character-string analyzing unit 142 may be integrated as one component. Conversely, the signature generating unit 14 may be distributed to a portion that performs the frequently appearing pattern analysis and a portion that performs the frequently appearing character string analysis. Further, the hard disk drive 108 that stores the network traffic data, the traffic information, the characteristic information, and the signature may be connected through a network or a cable as an external device of the received traffic character extractor 10.

REFERENCE SIGNS LIST

10 Reception traffic characteristic extraction server
11 Input unit
11*a* Network traffic data
12 Characteristic-information extracting unit
13 Clustering unit
14 Signature generating unit
15 Output unit
15*a* Signature
100 Computer
101 Memory
101*a* ROM
101*b* RAM
102 CPU
103 Hard disk drive interface
104 Disk drive interface
105 Serial port interface
106 Video adapter
107 Network interface
108 Hard disk drive
108*a* OS
108*b* Application program
108*c* Program module
108*d* Program data
109 Disk drive
110 Mouse
111 Keyboard
112 Display
141 Frequently-appearing-pattern analyzing unit
142 Frequently-appearing-character-string analyzing unit

The invention claimed is:

1. A traffic characteristic information extracting device comprising:
 a memory; and
 processing circuitry coupled to the memory and configured to:
  acquire traffic information satisfying a first predetermined condition from network traffic data,
  extract characteristic information from the acquired traffic information,
  classify the traffic information based on the extracted characteristic information,
  analyze a classification result obtained at the classifying and generate signatures,
  determine which of the generated signatures is a signature satisfying a second predetermined condition among the generated signatures,
  output the signature satisfying the second predetermined condition among the generated signatures,
  determine whether a terminal receives damage based on whether a response from a communication destination server includes the signature satisfying the second predetermined condition.

2. The traffic characteristic information extracting device according to claim 1, wherein the processing circuitry is further configured to extract the characteristic information based on at least one of information included in a header portion, information included in transmitted data, and information included in received data of the network traffic data.

3. The traffic characteristic information extracting device according to claim 1, wherein the processing circuitry is further configured to classify the traffic information using machine learning.

4. The traffic characteristic information extracting device according to claim 1, wherein, in analyzing the classification result, the processing circuitry is further configured to generate the signatures through a frequently appearing pattern analysis or a frequently appearing character string analysis.

5. The traffic characteristic information extracting device according to claim 4, wherein the frequently appearing pattern analysis is an analysis of information included in a header portion of the network traffic data.

6. The traffic characteristic information extracting device according to claim 4, wherein the frequently appearing pattern analysis is an analysis of information included in transmitted data and information included in received data of the network traffic data.

7. A traffic characteristic information extracting method that is performed by a traffic characteristic information extracting device, the traffic characteristic information extracting method comprising:
 acquiring traffic information satisfying a first predetermined condition from network traffic data;
 extracting characteristic information from the acquired traffic information;
 classifying the traffic information based on the extracted characteristic information;
 analyzing a classification result obtained at the classifying and generating signatures;

determining which of the signatures is a signature satisfying a second predetermined condition among the generated signatures;

outputting the signature satisfying the second predetermined condition among the generated signatures; and determining whether a terminal receives damage based on whether a response from a communication destination server includes the signature satisfying the second predetermined condition.

8. A non-transitory computer-readable recording medium storing therein a traffic characteristic information extracting program that causes a computer to execute a process comprising:

acquiring traffic information satisfying a first predetermined condition from network traffic data;

extracting characteristic information from the acquired traffic information;

classifying the traffic information based on the extracted characteristic information;

analyzing a classification result obtained at the classifying and generating signatures;

determining which of the generated signatures is a signature satisfying a second predetermined condition among the generated signatures;

outputting the signature satisfying the second predetermined condition among the generated signatures; and determining whether a terminal receives damage based on whether a response from a communication destination server includes the signature satisfying the second predetermined condition.

* * * * *